United States Patent Office 3,337,617
Patented Aug. 22, 1967

3,337,617
MANUFACTURE OF AROMATIC POLY-CARBOXYLIC ACIDS
Samuel B. Baker, Sarnia, Ontario, Canada, assignor to Esso Research and Engineering Company, a corporation of Delaware
No Drawing. Filed May 1, 1962, Ser. No. 192,029
7 Claims. (Cl. 260—523)

This invention relates to a process for producing aromatic polycarboxylic acids from substituted polynuclear aromatic compounds. More particularly this invention relates to the liquid phase oxidation of methyl substituted naphthalene containing feed streams with molecular oxygen in the presence of an aqueous alkaline medium at elevated temperatures. Still more particularly this invention relates to the oxidation of high molecular weight aromatic oils containing methylnaphthalenes in the presence of aqueous alkali to convert these methylnaphthalenes to valuable benzene tri and tetracarboxylic acids.

In recent years there has developed substantial interest in pyromellitic acid and the tricarboxylic acids, e.g. hemimellitic, trimellitic and trimesic acids as intermediates for the production of polyesters, polyamides, polyester-polyamides and polyurethanes. However, these acids are of commercial interest only to the extent that their cost can be made competitive with other related acids having the same or similar chemical functions. It is well known to convert polyalkyl benzenes, e.g. mesitylene, durene and the like to benzene polycarboxylic acids via conventional liquid phase catalytic air oxidation. This technique, however, is presently deficient as a commercial process in that the tri and tetramethyl benzenes required for it, even in a crude form, are known high octane components for gasoline and thus command a relatively high price. Isolating and purifying these polymethyl benzenes, which are required for this prior art oxidation process, also add an economic burden resulting in a high priced product.

It is one object of this invention to provide a process for the oxidation of relatively inexpensive polynuclear hydrocarbons to form the polycarboxy benzene compounds referred to above. It is another object of this invention to provide a novel system for the oxidation of these polynuclear aromatics which permits high yields and good selectivities to the desired acids. It is a further object of this invention to apply the oxidation process described herein to relatively crude high molecular weight hydrocarbon fractions containing the aforesaid polynuclear aromatic compounds, such fractions including those derived via conventional steam cracking, phenol extraction and other similar processes well known in the art. It is still a further object of this invention to provide a catalytic process for the oxidation of polynuclear hydrocarbons which is carried out in the presence of an aqueous alkaline medium.

The general reaction involved in the present process is shown in Equation I which follows:

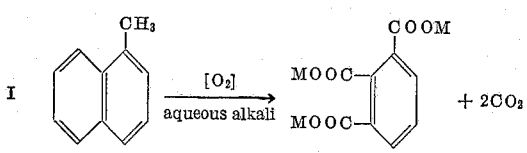

Thus, starting with 1-methylnaphthalene, oxidation in the presence of aqueous alkali leads to a splitting of one of the aromatic rings to provide the alkali metal salt of the tricarboxy benzene product.

An example of this reaction involving a carboxyl substituted naphthalene is shown in Equation II.

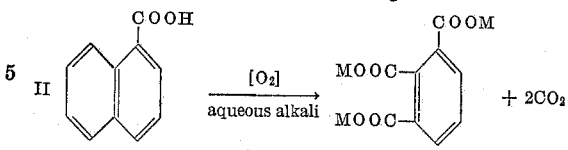

In Equation II naphthoic acid is reacted with oxygen in the presence of aqueous alkali to produce the same alkali salt of tricarboxy benzene as produced via oxidation of methylnaphthalene. Naphthoic acid may be prepared by mild oxidation of methylnaphthalene and then subjected to aqueous alkaline oxidation in accordance with this invention. Therefore in one sense the invention can be said to comprise the oxidation of

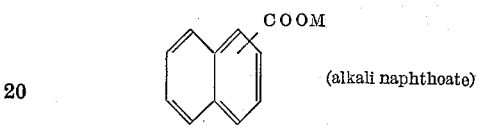

(alkali naphthoate)

since this product, it is theorized, is an intermediate in the aqueous alkaline oxidation of lower alkyl naphthalenes.

In a preferred embodiment the feedstocks amenable to this oxidation process are characterized by the following formula

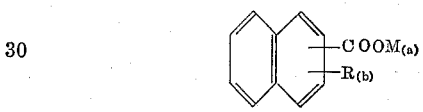

The hydrogen atoms are omitted for sake of convenience and in conformity with usual practice. The double ring structure is naphthalene having substituted on one ring thereof, carboxyl and/or alkyl groups. M represents H or a basic metal such as sodium or the like. R represents a $C_1$-$C_8$ non-tertiary alkyl group, $a=0$ to 4, $b=0$ to 4 and $a+b=1$ to 4. As will be described later polynuclear aromatics are also useful in this process.

While the reaction product of the present process is the alkali or other salt of the polycarboxylic acid, this salt can easily be converted to the free acid by any conventional technique. As an example, the sodium salt of 1,2,3-tricarboxy benzene may be neutralized with aqueous HCl or other inorganic acid to liberate free 1,2,3-tricarboxy benzene and sodium chloride. Using ammonium hydroxide as the alkaline material, M in Equations I and II will represent $NH_4+$ ion and this salt may be converted to the free acid by distillation at a temperature sufficient to distill off ammonia which will spring the free acid and permit the recovery of ammonia suitable for recycle after conversion to ammonium hydroxide. It is obvious that under some circumstances one may wish to stop at the salt stage and recover it as final product.

To better understand the reaction involved, reference may be had to Equation III which sets forth the theorized mechanism involved in the reaction.

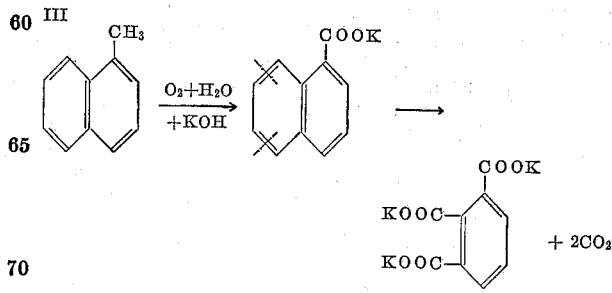

It is theorized as evidenced by Equation III that the methyl group converts to the alkal salt of a carboxy group and then under the severe conditions employed, the adjacent unsubstituted ring is attacked by the oxygen to cause oxidative degradation and to result in the conversion of the two carbon atoms connected to the substituted ring into carboxyl groups which convert to the salt in the presence of alkali. It is believed that the carboxylate group first produced in the oxidation of the methyl group protects the ring containing it from oxidative degradation and permits further oxidation of unsubstituted rings without destruction of this carboxyl group or the ring on which it is situated.

As evidenced by the few examples recited above, this process is applicable to substituted polynuclear aromatic compounds and in particular polynuclear compounds having one or more unsubstituted rings, and one or more rings substituted with alkyl and/or carboxy groups. Thus the substituted naphthalenes including 1-methylnaphthalene, 2-methylnaphthalene, 1-ethylnaphthalene, 1,2-dimethylnaphthalene, 1,2,3,4-tetramethylnaphthalene, 1,2,4-trimethylnaphthalene, 1,2-diethylnaphthalene, 1-methyl-3 carboxy naphthalene and the like, and in general lower mono, di and polyalkyl naphthalenes of this type are suitable. Naphthoic acids such as 1-carboxy naphthalene, 1,2-dicarboxy naphthalene, 2-carboxynaphthalene and the like may also be employed since the oxidation process of this invention preserves the existing carboxyl groups on at least one of the benzene rings in the feed material. In addition to the naphthalene type polynuclear aromatic compounds, similarly substituted higher molecular weight tri and tetranuclear aromatic compounds such as anthracene, phenanthrene, triphenylene, perylene, coronene, pyrene, tetracene, and the like may also be employed.

It has been found that the carbon atom connecting the alkyl group with the aromatic nucleus should contain an active hydrogen atom; otherwise, oxidation of the alkyl group to a carboxy radical is hindered. For ease of discussion these compounds will be referred to as lower ($C_1$–$C_8$) non-tertiary alkyl substituted polynuclear aromatic hydrocarbons. Thus alkyl substituents, which are attached to a benzene nucleus of the polynuclear aromatic compound via a tertiary carbon atom, i.e.

are generally undesirable as feed for the present reaction.

The oxidation reaction of this invention is carried out in liquid phase, under pressure and with elevated temperatures. In general, the particular temperature employed will depend, as in most oxidation reactions, on the other variables such as specific feed, concentration of oxygen, presence or absence of catalyst and the like. In a typical case, however, the alkyl substituted polynuclear aromatic compounds will start to oxidize in the presence of oxygen and at elevated pressures in the order of 1000 p.s.i.g. at about 175°–225° C. In most cases it is desirable to maintain the temperature below about 300° C. in order to avoid severe oxidative degradation or in fact substantial combustion of the feed material. A preferred temperature range for the methylnaphthalenes is from 225–275° C.; however, higher temperatures can be used with lower concentrations of oxygen, lower pressures, etc. As to the pressures, it has been found that oxygen pressures in the order of 300–2000 p.s.i.g. are preferred and more preferably oxygen pressures in the order of 500–1500 p.s.i.g. The time required for oxidation will vary; however, under the preferred conditions set forth herein, oxidation for a period of 4–5 hours will yield conversions up to about 80% on feed. As examples of the alkaline medium which is necessary for the oxidation process of this invention there may be employed aqueous sodium hydroxide, potassium hydroxide, ammonium hydroxide, calcium hydroxide, sodium phosphate, sodium bicarbonate, sodium metasilicate, sodium carbonate, and the potassium and ammonium salts of the latter three. Aluminate and zincate salts are also useful. In general, it is preferred to use basic salts and hydroxides of the Groups I-A and II-A metals of the Periodic Chart and especially preferred for reasons of economics is ammonium hydroxide which may be easily recovered and recycled to the reaction. Thus inorganic bases in general are useful in the present reaction.

The oxidation may be carried out by bubbling pure or dilute oxygen through the hydrocarbon feed under reaction temperatures and pressures preferably while the hydrocarbon is stirred or otherwise agitated to effect good mixing during the reaction period. In lieu of using pure oxygen, molecular oxygen containing gases such as air or oxygen combined with an inert gas, e.g. nitrogen in an oxygen volume percent of from 3 to 100% based on total oxygen containing gas, may be employed. High concentrations of oxygen will permit the reaction to proceed at slightly lower temperatures and pressures whereas the more dilute oxygen containing gases will require more severe conditions. When employing less than pure $O_2$ the $O_2$ partial pressure shall be maintained preferably from 300–2000 p.s.i.g.

The amount of aqueous base employed will depend on the particular reaction product sought. In general, however, the use of one equivalent of alkaline material for each carboxyl group plus one additional equivalent of alkaline material per mole of carbon dioxide product resulting from oxidative degradation is preferred. The term "equivalent" as employed herein with respect to the base, means an amount sufficient to form the salt of a single carboxyl group. Thus with NaOH one mole per carboxy group in the reaction product plus one mole per mole of $CO_2$ liberated is considered stoichiometric. With

a divalent basic metal, one half of these molar concentrations will be required. To clarify the amount of base required for a given reaction, reference may be had to the oxidation of 1-methylnaphthalene as set forth in Equation IV.

IV

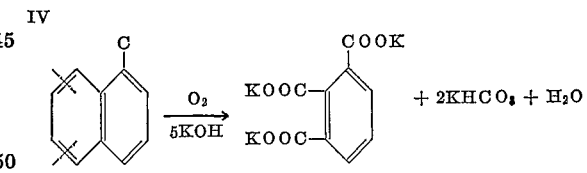

As noted from the reaction mechanism, the reaction product contains three carboxyl groups. In addition two carbon atoms from the unsubstituted benzene ring have broken off and formed two moles of carbon dioxide which have been shown in the form of a salt. Hence, on a stoichiometric basis, 5 moles of potassium hydroxide are required to form the corresponding salts of the organic and carbonic acids formed. Large excesses of base do not appear to effect any deleterious result in the over-all reaction mechanism.

In the case of employing an alkyl naphthalene having more than one carbon atom in the alkyl group, sufficient alkali should be present to neutralize or combine with the carbon dioxide formed by the oxidation of the carbon atom(s) in the alkyl chain. It is preferred in any case to have excess base present in the reaction mixture to permit the rapid formation of the salt of the carboxylic acid and thus prevent oxidative degradation of this carboxy group. It is therefore preferred with the feed stocks mentioned above to employ at least three equivalents of base per mole of substituted polynuclear aromatic hydrocarbon feed.

Water, a necessary ingredient of the reaction mixture, acts principally as an ionizing diluent. The liquid phase reaction mechanism referred to herein is heterogeneous, being essentially a two-phase system, aqueous and oil. Water acts as a carrier for the inorganic base and should be present in amounts sufficient to permit good ionization of the alkaline material and further to permit good contact between the salt forming cations and the oil phase. The amount of water employable in this process can be best expressed in terms of aqueous base concentration. Thus it is preferred to use the alkaline material in aqueous concentrations of from 2 to 40 wt. percent, e.g. 2–40 wt. percent KOH or other alkali in water. More preferably, however, alkali concentrations of 15 to 30 wt. percent are preferred. In any event, sufficient water to permit mobility of the reaction mixture is preferably employed. Since the reaction is heterogeneous, it is preferred to stir rapidly or agitate the reaction mixture during oxidation.

While no mention has been made of oxidation catalysts, the reaction mechanism involved herein is amenable to their use. Due to the high temperatures required for the non-catalytic oxidation of the polynuclear aromatic feeds referred to, substantial degradation resulting primarily from slow combustion of the product may occur. Combustion can be minimized to a considerable degree by the employment of an oxidation catalyst and lower temperatures. It has been found that any of a number of oxidation catalysts may be employed to permit the use of lower oxidation temperatures. In particular potassium nitrate and ammonium metavanadate have been found to be especially effective. Additionally, by the use of a catalyst such as ammonium metavanadate the induction period required for oxidation reactions of this type can be reduced or in fact eliminated, and the overall oxidation temperature can be lowered 25° to 50° C. and even more. The catalyst may be employed in conventional quantities, e.g. 0.01–5 wt. percent, preferably 0.1–2 wt. percent, based on feed. Other catalysts which may be employed for this reaction include salts made from Groups V–b, VI–b metals.

Although the salts of polycarboxylic benzene compounds are useful as such, for most purposes it will be desirable to convert them to the free acids. As already explained in the case of employing an ammonium ion base the resultant ammonium salt of the polycarboxylic acid may be simply heated to a temperature in the order of 200° to 250° F. for a time sufficient to drive off all of the ammonia. This will spring the free acid and the ammonia may be bubbled through water at lower temperatures to reform ammonium hydroxide in a form suitable for reuse. When metal salts of the polycarboxylic acids are formed the acids are easily sprung by an inorganic acid wash, e.g. dilute HCl or other acid.

Separation techniques for organic acids of the type prepared herein are well known in the art. The tri and polycarboxy benzene compounds produced by the aforedescribed oxidation are generally soluble in water and may be extracted with a low molecular weight organic solvent such as ethyl acetate or water insoluble ketones such as hexanone-2, the latter solvents being distilled overhead to recover pure polycarboxy benzene compound. Alternatively, the aqueous acid mixture may be evaporated to dryness and the polycarboxy benzene dissolved in acetone or the like to separate it from insoluble inorganic salt residue. The acetone may then be stripped from the free acid.

In the case of producing hemimellitic and trimellitic acids, separation can be achieved by esterifying these acids with methanol, using conventional esterification techniques. Since hemimellitic acid is sterically hindered, its 2-position carboxyl group does not esterify and its esterification product is therefore an acidic dimethyl hydrogen hemimellitate. The trimellitic acid being non-sterically hindered, esterifies completely to the tri-ester to produce a neutral product. Simple bicarbonate wash effectively separates the dimethyl hydrogen hemimellitate from the dimethyl ester of trimellitic acid.

The feed materials referred to previously are known compounds which may be employed individually. Additionally, these polynuclear aromatic compounds are commonly found in certain petroleum fractions and may be used in their crude state or after a degree of purification. In particular polynuclear aromatic compounds of this type are obtainable by steam cracking petroleum fractions such as gas oil, naphtha, and the like. As an example, a typical steam cracked gas oil fraction having a boiling range of 430°–550° F. has been found to contain approximately 63% methylnaphthalenes which may be converted by the oxidation process of this invention to mixtures of hemimellitic and trimellitic acids. These petroleum fractions are of particular interest since they are low in cost and are in most cases a by-product of steam cracking processes. The term "steam cracking" is employed herein to mean subjecting a petroleum fraction such as gas oil to elevated temperatures in the order of 1200°–1500° F. for a period usually less than one second in the presence of large quantities of steam, e.g. 5 to 20 moles. Such steam cracking processes will yield a variety of low molecular weight hydrocarbons, including olefins, diolefins, acetylenes and the like, and in addition rather large quantities of the higher molecular weight fractions containing polynuclear aromatic hydrocarbons such as mentioned previously. The polynuclear aromatic compounds derived from steam cracking may be employed as such in the oxidation reaction as described herein, or if desired they may be treated by conventional means such as acid washing to remove impurities. It has been surprisingly found, in the case of these crude fractions, that the initiation temperature for the oxidation varies depending on the cleanliness of the feed. A 430°–550° F. steam cracked gas oil fraction under the oxidation conditions generally discussed above and in the presence of aqueous alkaline medium will have a relatively low initiation temperature as compared to the same crude fraction after it has been treated by mild acid washing. As an example, a sulfuric acid washed steam cracked gas oil fraction having a boiling range of 430°–550° F. was found to have an initiation temperature of about 25° C. higher than its corresponding unwashed fraction. It is theorized that the impurities which have been removed by the acid wash have some catalytic or other effect on the initiation temperature. This is further borne out by the fact that reasonably pure 2-methylnaphthalene requires under otherwise the same conditions an initiation temperature of 275° C. or approximately 50° greater than the crude untreated steam cracked polynuclear aromatic fraction referred to previously. Technical grade 1-methylnaphthalene probably containing 2-methylnaphthalene and small amounts of impurities which may have been oxidation promoters, began to oxidize at 225° C.

Typical steam cracking conditions and feed which will result in the production of higher molecular weight fractions containing the polynuclear aromatic hydrocarbons are shown in the following table.

TABLE I

Gas oil feedstock:
    Aromatics _____wt. percent__ 27
    Saturates _____do____ 70
    Polar compounds _____do____ 3
Conditions:
    Coil outlet temp., ° F. _____ 1400
    Dry gas, wt. percent _____ 44.3
    Feed rate, g./hr. _____ 1580
    Mol percent steam _____ 80
    Mol percent hydrocarbon feed _____ 20
Product fractions, ° F.:
    300–430 _____yield on feed, wt. percent__ 6.3
    430–550 _____do____ 6.81
    550–650 _____do____ 5.24

A typical analysis of a steam cracked gas oil fraction having a boiling range of 430–550° F. follows:

TABLE II

| | Wt. percent |
|---|---|
| Naphthalenes | 59.4 |
| Total aromatics | 78.5 |
| $C_{10}$ aromatics | 3.5 |
| $C_{11}$ aromatics | 8.5 |
| Indans | 2.8 |
| Saturates and olefins | 21.5 |

Bromine No., 18.8.

This invention and its various modifications will be better understood by reference to the following examples setting forth specific embodiments thereof.

EXAMPLE I

*Preparation of trimellitic acid*

Into a 1 gal. stirred autoclave was added KOH solution (27 wt. percent—1500 ml.) and 2-methyl-naphthalene (200 g.). The vessel was sealed and pressured to 600 p.s.i.g. with pure oxygen. The stirrer and heater were started and after 1.5 hrs., during which time the internal pressure reached 1375 p.s.i.g., oxygen absorption began. The temperature at this stage was 275° C. This temperature and pressure were maintained automatically for 5 hrs. The vessel and contents were cooled to 35° C. and after pressure release, the contents were blown into a receiver, the vessel washed with a small volume (200 ml.) water and benzene (200 ml.). The combined solutions were extracted twice with fresh benezene and the benzene solution, after work-up, was found to contain 55% unreacted feed. The aqueous phase was concentrated to 500 ml., neutralized with hydrochloric acid and then further concentrated to dryness. The nearly white product was extracted thrice with hot acetone and filtered. The filtrate was concentrated, resulting in 26 g. of nearly pure trimellitic acid. This was 29 wt. percent yield, or 19.6% of the theoretical yield.

EXAMPLE II

*Preparation of trimellitic and hemimellitic acids*

Into a 1 gallon stirred autoclave was added water (600 ml.), concentrated ammonium hydroxide (200 ml.), ammonium metavanadate (1.0 g.) and an aromatic gas oil product (100 g.) having a boiling range of 430° to 550° F. The vessel was pressured with oxygen at 600 p.s.i.g. and then heated. At 175° C. oxygen absorption occurred, and this temperature was maintained for 5 hrs. The vessel and contents were cooled to 30° C. and the contents blown into a receiver. The vessel was washed once with benzene and once with water. The combined solutions were then separated into a benzene layer and an aqueous layer. The benzene layer, after work-up, contained 20 g. of apparently unreacted material. Ammonia and carbon dioxide were stripped out of the aqueous solution by boiling, the water being replaced from time to time to maintain the original volume. Finally, when ammonia evolution ceased, the turbid solution was allowed to cool and 2 g. of a product was deposited. This was found to be a mixture of 1- and 2-naphthoic acids. The filtrate from the latter separation was then concentrated to dryness and the residue dissolved by extraction with hot acetone. The acetone solution, after filtration from a small amount of inorganic material, was evaporated to dryness leaving 20.9 g. of acidic material.

The dry acidic material was dissolved in anhydrous methanol (150 ml.) containing 4 g. of anhydrous hydrogen chloride. The mixture was allowed to stand overnight at room temperature (22° C.) and the solvent and hydrogen chloride flashed off at 30° C. in vacuo. The residual oil was dissolved in diethyl ether and the ethereal solution washed twice with aqueous sodium carbonate. The ethereal solution was dried and solvent removed, leaving a light colored neutral oil. This weighed 11 g.

The aqueous carbonate solution was acidified with dilute hydrochloric acid and the mixture extracted with ether. The ethereal solution was concentrated to dryness leaving 12 g. of an acidic oil. The first neutral oil was heated with 25 ml. of 10% aqueous sodium hydroxide for 30 minutes and then acidified with hydrochloric acid. After concentration to dryness, the residual white product was extracted three times with hot acetone. The acetone solution was filtered hot and concentrated to 30 ml. On cooling, a white crystalline product separated and weighed 8.6 g. This had a melting point of 235° to 239° C. and after solidification, it melted at 162.5° to 163.5° C. which indicated the product to be trimellitic acid.

The acidic oil was similarly saponified and, after work-up as above, yielded 8.4 g. of a white crystalline product. Melting point and conversion to the anhydride indicated the product to be hemimellitic acid.

Further examples of this invention may be found in the following table:

TABLE III.—AROMATIC TRICARBOXYLIC ACIDS

| Run No. | Feedstock [1] | T., ° C. | Press., p.s.i.g. | $O_2$ Moles Consumed | Converted Weight Percent on Feed | Acids Produced—Yield of Acids, Wt. Percent on Aromatics Converted | | |
|---|---|---|---|---|---|---|---|---|
| | | | | | | Total | $H_2O$ Insol. (—Naphthoic) | Hemimellitic and Trimellitic |
| | Steam Cracker Gas Oil Product [3] | | | | | | | |
| 1 | 430–550° F. Untreated | 175 | 1,150 | 0 | 0 | 0 | 0 | 0 |
| 2 | do | 225 | 1,300 | 6 | 79 | 64 | 6.8 | 58 |
| | Catalyzed [2] | | | | | | | |
| 3 | do | 200 | 850 | 1.4 | 48 | 23 | 7.0 | 16 |
| 4 | do | 225 | 1,200 | 5.7 | 80 | 58 | 8.0 | 49 |
| 5 | do | 175 | 900 | 5.6 | 80 | 56 | 6.0 | 51 |
| 6 | 430–550° F. Treated | 225 | 1,250 | 2 | 51 | 37 | 7.0 | 33 |
| 7 | do | 250 | 1,375 | 6 | 78 | 63 | 7.0 | 56 |
| | Pure Compounds | | | | | | | |
| 8 | 1-methylnaphthalene | 225 | 1,250 | 6 | 80 | 68 | 5.5 | 63 |
| 9 | 2-methylnaphthalene | 275 | 1,375 | 6 | 45 | 33 | 4.0 | [4] 29 |
| 10 | 1-naphthoic acid | 275 | 1,250 | 2.9 | | | 4.0 | [5] 60 |

[1] Stirred autoclave charged with oil (200 g., Runs 1, 2, 6, 7, 8, 9; 100 g., Runs 3, 4, 5, 10), 27%; KOH (1,500 ml.), oxygen added to 600 p.s.i.g. then heated to operating temperature. Reaction time was 5 hours.
[2] Catalyzed Runs 3, 4, 5—100 g. charge, 27% KOH (800 ml.). Run 5 $NH_4OH$ (200 ml.) in 600 ml. $H_2O$. Runs 3, 4, 5 were catalyzed by $KNO_3$; $Co(NO_3)_2 + Mn Br_2$; $NH_4VO_3$ respectively.
[3] Aromatic content, 63% methylnaphthalenes.
[4] Trimellitic.
[5] Hemimellitic.

In the above runs, pure molecular oxygen was employed although dilute oxygen may be utilized, provided the initiation temperatures are not so high as to cause combustion and other undesirable degradative processes to occur.

What is claimed is:

1. A process for preparing polycarboxybenzene compounds containing at least three carboxy groups which comprises reacting a polynuclear compound of the following formula:

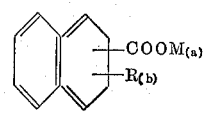

wherein M is selected from the group consiting of a basic metal and hydrogen, R is a $C_1$ to $C_8$ non-tertiary alkyl group, $a$ equals 0 to 4, $b$ equals 0 to 4 and $a+b$ equals 1 to 4, in liquid phase at a temperature in the range of 175° to 300° C. and a pressure in the range of 300 to 2000 p.s.i.g. with a molecular oxygen-containing gas in the presence of an aqueous inorganic base selected from the group consisting of ammonium hydroxide and the hydroxides of Groups I-A and II-A metals of the Periodic Chart, said base being present in an amount sufficient to form the salt of the carboxy groups in the resultant polycarboxybenzene compound.

2. A process of claim 1 wherein said polynuclear compound is derived from a steam-cracked petroleum fraction.

3. A process in accordance with claim 1 wherein said reaction is carried out in the presence of an oxidation catalyst.

4. A process in accordance with claim 1 wherein said polynuclear compound is 1-methylnaphthalene.

5. A process in accordance with claim 1 wherein said polynuclear compound is 2-methylnaphthalene.

6. A process in accordance with claim 1 wherein said polynuclear compound is selected from the group consisting of naphthoic acid and salts thereof.

7. A process for preparing hemimellitic and trimellitic acids which comprises reacting a mixture of methylnaphthalenes derived by steam cracking gas oil, in liquid phase with oxygen at a temperature below about 300° C. and a pressure between 300–2000 p.s.i.g., in the presence of an aqueous base selected from the group consisting of Groups I-A and II-A metal salts and ammonium salts to obtain the salts of said hemimellitic and trimellitic acids and subsequently hydrolyzing said salts to form the free acids.

References Cited

UNITED STATES PATENTS

| | | | |
|---|---|---|---|
| 2,176,348 | 10/1939 | Juettner | 260—515 XR |
| 2,698,865 | 1/1955 | Katzschamm | 260—524 |
| 2,963,508 | 12/1960 | Barker et al. | 260—524 |
| 3,007,942 | 11/1961 | Burney et al. | 260—524 XR |

FOREIGN PATENTS

| | | |
|---|---|---|
| 788,276 | 12/1957 | Great Britain. |
| 808,581 | 2/1959 | Great Britain. |

OTHER REFERENCES

Benger et al.: Chemical Abstracts, vol. 32, page 5374, 1938.

Brewster: Organic Chemistry, N.J., Prentice Hall, Inc., 1949.

Holly et al.: Chemical Abstracts, vol. 50, pages 3730–31, 1956.

Roy et al.: Chemical Abstracts, vol. 51, page 13835, 1957.

Roy et al.: Chemical Abstracts, vol. 52, page 15025, 1958.

LORRAINE A. WEINBERGER, *Primary Examiner.*

LEON ZITVER, *Examiner.*

M. S. JAROSZ, L. ARNOLD THAXTON, *Assistant Examiners.*